Dec. 1, 1959     T. W. HORN     2,915,156
POWER TRANSMITTING DRIVE EMBODYING FRICTION CLUTCH
Filed Sept. 6, 1955
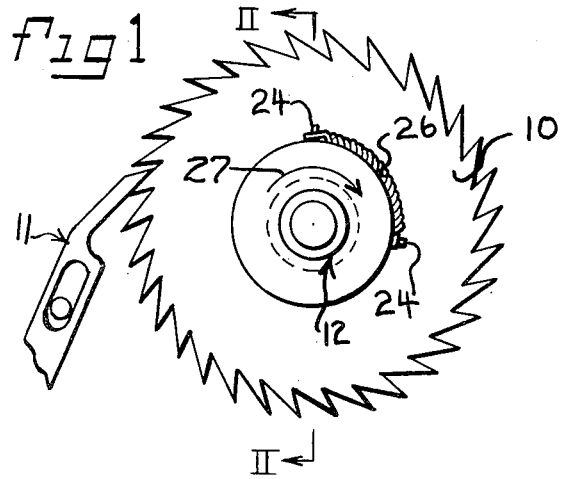
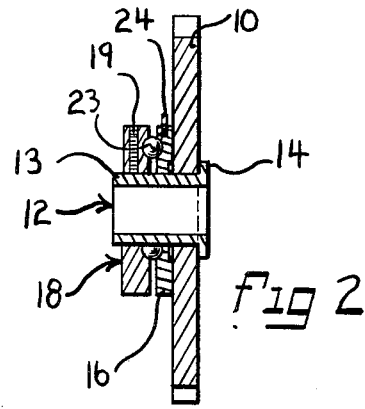
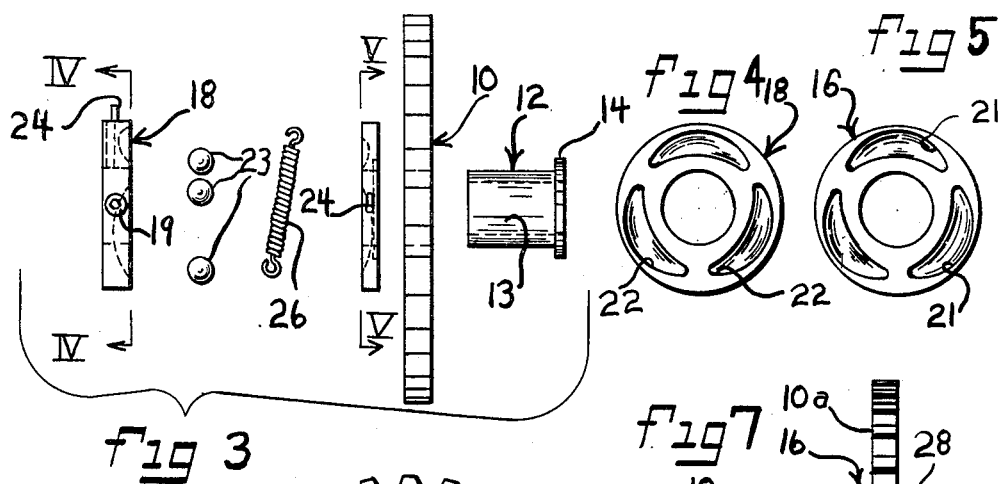
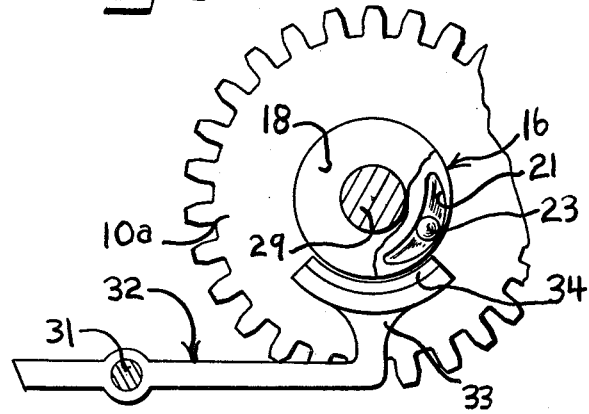
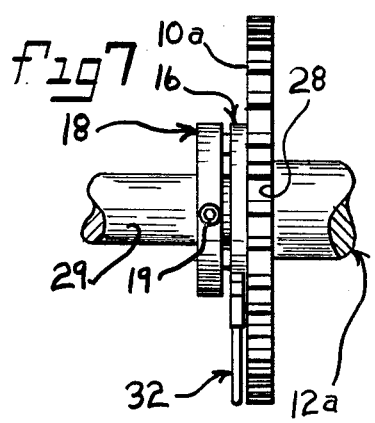
INVENTOR.
Thurman W. Horn
BY Jennings & Carter
Attorneys

United States Patent Office 2,915,156
Patented Dec. 1, 1959

2,915,156

POWER TRANSMITTING DRIVE EMBODYING FRICTION CLUTCH

Thurman W. Horn, Anniston, Ala.

Application September 6, 1955, Serial No. 532,617

3 Claims. (Cl. 192—41)

My invention relates to a power transmitting drive and relates more particularly to such apparatus embodying means effective to engage a friction clutch associated therewith in such manner as to bring about connection between the parts for rotation in different directions.

In many instances in mechanics, especially in transmitting fractional horsepower loads, it is desired to have a gear, pulley, wheel, or the like rotate freely in one direction relative to a supporting shaft or the like, and to lock onto the shaft upon opposite relative rotation. It often is desirable to lock a gear, pulley or wheel to a shaft upon relative rotation in either direction and at the same time to provide means to free the gear for relative rotation in either direction. Also it is desirable to lock the shaft and gear together when power is supplied to the shaft to rotate the same in either direction and yet to leave the gear free for rotation in either direction when power is applied to the gear. My invention has particular application in the construction of such devices as taxicab meters. As is known, taxicab meters register the passage of time as well as the passage of miles. Such apparatus generally embodies a shaft which is driven from the vehicle and clock means which in turn drives the recording portion of the meter during those times when the vehicle is standing still. It is desirable, therefore, to have the clock commence to drive the indicating mechanism immediately upon the vehicle coming to rest, without loss of time. My invention is particularly adapted for this purpose.

In view of the foregoing an object of my invention is to provide apparatus having the foregoing features in which the element to be driven, such as the gear, is mounted freely on a supporting, driving shaft, and is locked thereto through the medium of a friction clutch which is adapted operatively to engage the driven element, there being a wedge type connector having a thrust element secured to the shaft and disposed upon opposite relative rotation of the driven member and the shaft to engage the friction clutch, thereby to lock the driven element to the shaft.

Another object is to provide a power transmission drive in which a driven element such as a gear is mounted freely on a driving element such as a shaft, there being a friction clutch having a part freely rotatable on the shaft and freely rotatable relative to the gear, together with means on the shaft effective upon a braking action on the clutch part frictionally to lock the latter both to the gear and shaft, thereby locking the gear and shaft together, regardless of the direction in which the gear is driven by the shaft.

Another object is to provide apparatus of the character designated in which the gear and shaft may be locked together as described simply by releasing the braking action on the clutch part, even though the driving element is the driven one, or vice versa.

Apparatus illustrating the features of my invention is shown in the accompanying drawings forming a part of this application in which:

Fig. 1 is an elevational view of my improved apparatus and illustrating the same as embodying a ratchet gear adapted to be driven in one direction, there being shown in diagrammatic manner a ratchet for driving the gear;

Fig. 2 is a detail sectional view taken generally along line II—II of Fig. 1;

Fig. 3 is an exploded view showing the several parts of the apparatus of Figs. 1 and 2;

Fig. 4 is a detail view taken geenrally along line IV—IV of Fig. 3 and showing the arcuate grooves or sockets in the face of the thrust member;

Fig. 5 is a view similar to Fig. 4 and taken generally along line V—V of Fig. 3 and showing the complementary arcuate grooves or sockets in the face of the friction clutch element;

Fig. 6 is a fragmental side elevational view of a slightly modified form of my invention, certain of the parts being broken away and in section, and showing in diagrammatic manner means for braking the friction clutch element; and, Fig. 7 is an elevational view of the device shown in Fig. 6.

Referring now to the drawings for a better understanding of my invention and more particularly to Figs. 1 to 5, inclusive, I show a ratchet gear 10 which may be driven in the direction indicated by a power actuated pawl indicated generally and diagrammatically by the numeral 11. The gear 10 is mounted on a driven shaft 12, shown as being a hollow bushing with a shank portion 13 and an abutment in the form of a flange 14. The gear 10 is mounted for free rotation on the bushing and one face of the gear bears against the flange 14 as indicated.

Mounted next adjacent the gear 10, on the face thereof opposite the flange 14, is a friction clutch element indicated generally by the numeral 16. The clutch element is mounted for free rotary movement on the shank 13 of the bushing 12 and has a face which frictionally engages the side of the gear 10 as indicated.

Spaced axially from the clutch element 16 is a thrust member indicated generally by the numeral 18. The member 18 is made fast to the bushing 12 by means of a set screw 19.

The adjacent faces of the clutch element 16 and the thrust member 18 are provided with arcuate grooves 21 and 22, respectively. The grooves are deepest adjacent the mid-portions and become gradually shallower from the mid-portion towards their ends. Adapted to fit in the grooves 21 and 22 are steel balls 23. The balls 23 are of such diameter relative to the minor depth of the grooves 21 and 22 that when the parts 16 and 18 rotate slightly relative to each other, the parts are locked together through the balls as will appear.

Projecting from the periphery of the clutch element 16 is a pin 24. A similar pin 24 projects from the periphery of the thrust member 18. A tension spring 26 has its ends anchored over the pins in such manner as to hold the members 16 and 18 in fully rotated position, in one direction, as permitted by the steel balls 23 and the grooves 21 and 22. It will be noted that the combined depth of each set of grooves 21 and 22 adjacent the mid-portions thereof is slightly larger than the diameter of the balls 23.

From what has been described the method of constructing and using the aforesaid modification of my invention will be readily understood. If it be assumed that there is connected to the shaft or bushing 12 a member, not shown, which rotates the bushing in the direction of the arrow 27, Fig. 1, it will be seen that the gear 10 is effectively locked to the shaft. This comes about due to the fact that the spring 26 holds the clutch element or part 16 slightly rotated relative to the thrust member 18, keeping the balls 23 seated in the shallow parts of the sockets 21 and 22, thereby wedging the member 16 into frictional contact with the side of the gear 10. Therefore, when the bushing 12 is rotated in the direction of the arrow 27, that is, in the same direction of rotation that the spring 26 urges the parts 16 and 18, gear 10 is effectively locked to the shaft 12 by the frictional engagement therewith of the clutch element 16. Let it now be assumed that the shaft 12 is held stationary and that it is desired to continue to drive ratchet gear 10 in the direction of arrow 27 without driving the shaft. Under these conditions it will readily be apparent that as ratchet 11 rotates the gear in the direction of arrow 27 the spring 26 is stretched very slightly, thus moving the balls very slightly back into deeper parts of the grooves 21 and 22, thereby releasing the axial pressure on the clutch member 16, thereby freeing the gear 10 for rotation relative to all of the remaining parts. My improved power transmitting drive thus provides means whereby the gear 10 or any similar member is always readied for rotation in the same direction that the shaft 12 rotates it, even though the shaft be stationary and power applied to the gear. It will be noted that immediately that the shaft 12 stops rotation, assuming the pawl mechanism 11 to be operating, the gear is continued in its rotary motion without delay.

Referring now to Figs. 6 and 7 of the drawing I show a slightly modified form of my invention in which the shaft 12a is shown as having an abutment or shoulder 28 thereon against which a gear 10a bears. The reduced portion 29 of the shaft is the part on which the gear 10a and the clutch element 16 are mounted for rotation. The thrust member 18 is secured to the reduced part by the set screw 19 already described. The balls 23 are interposed in the grooves 21 and 22, precisely in the manner already described.

As has been before stated, the object of this modification of the invention is to provide a drive in which the gear 10a is normally locked to the shaft 12a, regardless of the direction in which the shaft is rotated and yet, to provide means which shall be effective to free the gear 10a for rotation in either direction when power is applied to the gear as distinguished from applying power to the shaft. To this end I pivotally mount on a pivot point 31 an arm 32. The arm 32 has an upwardly extending portion 33 under the clutch element 16. An arcuate section of friction material 34 is provided in the upper end 33 so that upon upward movement of the end 33 the friction material 34 contacts the periphery of the clutch.

From the foregoing description it will be seen that when the shaft 12a is rotated in either direction the inertia of the gear 10a and the other parts causes the balls to wedge in the shallow parts of the sockets 21 and 22, locking the gear to shaft 12a through clutch member 16, balls 23 and thrust member 18. This is true also in the event power is applied to the gear 10a, in either direction, instead of power being applied to the shaft in either direction. However, if it is desired to free gear 10a for rotation independently of shaft 12a, the friction material 34 is brought into engagement with the periphery of the clutch element 16. This braking action holds clutch element 16 stationary, causing balls 23 to remain in the deep portions of the sockets 21—22, thus freeing gear 10a for independent rotation relative to the other parts.

From the foregoing description it will be apparent that I have devised an improved power transmission means. My invention is particularly useful where it is desired immediately to pick up the rotation of a gear from a power source applied to the gear, upon the stopping of a shaft which previously has been rotating the gear, without delay. It will be understood that the mechanism finally to be driven may be connected in various ways to the gears 10 or 10a, either by attaching the same to the face of the gear in the case of the gear 10 or by a pinion, not shown, in mesh with the gear 10a. At all events, in actual practice I have found that my invention is particularly adapted for use in association with certain driven and driving parts in taxicab meters and similar devices. It will be apparent, however, that my invention has various other uses.

While I have shown my invention in but two forms, it will be obvious to those skilled in the art that it is not so limited but is susceptible of various other changes and modifications without departing from the spirit thereof, and I desire, therefore, that only such limitations shall be placed thereupon as are specifically set forth in the appended claims.

What I claim is:

1. In power transmitting apparatus, a shaft having an abutment thereon, a gear or the like mounted freely on the shaft adjacent said abutment and having one face in contact with the abutment, a thrust member secured to said shaft for rotation therewith and spaced axially from said abutment, a friction clutch element freely mounted on the shaft between said thrust member and said gear, said clutch member being in frictional contact with the gear and being spaced from the thrust member, wedge locking means interposed between said thrust member and said clutch element and adapted for forcing said clutch element along said shaft into frictional locking engagement with said gear and for locking said freely mounted clutch element for rotation with said thrust member, means to rotate said gear, the rotation of said shaft in one direction at a speed greater than the rotation of said gear forcing the clutch element through said locking means into frictional locking engagement with said gear and being effective for driving said gear, and resilient means operatively connected between said clutch element and said thrust member and coacting with said wedge locking means to move said clutch element axially along said shaft out of frictional engagement with said gear whereby the rotation of said gear in said one direction while said shaft is stationary releases said clutch element from locking engagement with said gear and allows independent relative rotation of said gear permitting said gear to be driven independently of said shaft and said clutch element.

2. In power transmitting apparatus, a shaft having an abutment thereon, a gear or the like mounted freely on the shaft adjacent said abutment and having one face in contact with the abutment, a thrust member secured to said shaft for rotation therewith and spaced axially from said abutment, a friction clutch element freely mounted on the shaft between said thrust member and said gear, said clutch member being in frictional contact with the gear and being spaced from the thrust member, there being complementary cam shaped sockets in the adjacent faces of said thrust member and said clutch element, a ball in each of said sockets of a diameter relative to the depth of the sockets to force said clutch element along said shaft into frictional locking engagement with said gear and to lock said freely mounted clutch element for rotation with said thrust member upon rotation of the shaft and thrust member in one direction, means to rotate said gear, the rotation of said shaft in one direction at a speed greater than the rotation of said gear forcing the clutch element into frictional locking engagement with said gear and being effective for driving said gear, and resilient means operatively connected between said clutch element and said thrust member and coacting with said balls and sockets to move said clutch element axially along said shaft out of frictional engagement with said gear whereby the rotation of said shaft in said one direction at a speed less than the rotation of said gear releases said clutch element from locking engagement with said gear and allows independent relative rotation of the gear permitting said gear to be driven independently of said shaft and said clutch element.

3. Power transmitting apparatus as defined in claim 2 and further characterized in that said resilient means operatively connected between said clutch element and said thrust member comprises a tension spring.

References Cited in the file of this patent

UNITED STATES PATENTS

| | | |
|---|---|---|
| 767,844 | Smith | Aug. 16, 1904 |
| 1,585,140 | Erban | May 18, 1926 |
| 1,937,211 | Vondra | Nov. 28, 1933 |
| 2,299,621 | Giffen et al. | Oct. 20, 1942 |
| 2,448,763 | Bloomfield | Sept. 7, 1948 |
| 2,711,237 | Wylie | June 21, 1955 |

FOREIGN PATENTS

| | | |
|---|---|---|
| 19 | Great Britain | Jan. 1, 1910 |
| 163,440 | Great Britain | May 13, 1921 |
| 635,157 | France | Dec. 20, 1927 |